United States Patent
Ling et al.

(10) Patent No.: US 11,906,861 B2
(45) Date of Patent: Feb. 20, 2024

(54) DISPLAY PANEL AND DISPLAY DEVICE

(71) Applicant: Xiamen Tianma Micro-Electronics Co., Ltd., Fujian (CN)

(72) Inventors: Ankai Ling, Fujian (CN); Limei Zhou, Fujian (CN); Menglan Chen, Fujian (CN); Poping Shen, Fujian (CN)

(73) Assignee: Xiamen Tianma Micro-Electronics Co., Ltd., Fujian (CN)

( * ) Notice: Subject to any disclaimer, the term of this patent is extended or adjusted under 35 U.S.C. 154(b) by 0 days.

(21) Appl. No.: 17/617,083

(22) PCT Filed: Nov. 17, 2020

(86) PCT No.: PCT/CN2020/129404
§ 371 (c)(1),
(2) Date: Dec. 7, 2021

(87) PCT Pub. No.: WO2022/068006
PCT Pub. Date: Apr. 7, 2022

(65) Prior Publication Data
US 2023/0221604 A1    Jul. 13, 2023

(30) Foreign Application Priority Data
Sep. 30, 2020 (CN) .......................... 202011065937.9

(51) Int. Cl.
*G02F 1/1362* (2006.01)
*B60K 37/06* (2006.01)

(52) U.S. Cl.
CPC ........ *G02F 1/136286* (2013.01); *B60K 37/06* (2013.01); *G02F 1/136209* (2013.01); *G02F 1/136222* (2021.01); *B60K 2370/152* (2019.05)

(58) Field of Classification Search
CPC ......... G02F 1/136286; G02F 1/136209; G02F 1/136222; B60K 37/06; B60K 2370/152
(Continued)

(56) References Cited

U.S. PATENT DOCUMENTS

2007/0236640 A1*  10/2007  Kimura ................. G02F 1/1368
                                                      257/E27.111
2009/0323005 A1*  12/2009  Ota ..................... G02F 1/13439
                                                                349/143
2012/0188496 A1*   7/2012  Nomura ............ G02F 1/134363
                                                                349/123

FOREIGN PATENT DOCUMENTS

CN           101140394 A       3/2008
CN           102279493 A      12/2011
(Continued)

OTHER PUBLICATIONS

International Search Report for the International Patent Application PCT/CN2020/129404, dated Jul. 2, 2021, 10 pages.

*Primary Examiner* — Charles S Chang
(74) *Attorney, Agent, or Firm* — KDW Firm PLLC

(57) ABSTRACT

Provided are a display panel and a display device. The display panel includes multiple data lines and multiple scanning lines. The multiple data lines intersect with the multiple scanning lines to define multiple pixel units arranged in an array, and the data lines are insulated from the scanning lines; and pixel electrodes of pixel units that are among the multiple pixel units and in at least portion of the array include multiple first branch electrodes arranged in parallel; along a direction of the multiple scanning lines, each of the multiple first branch electrodes includes multiple first branch electrode segments connected sequentially; and an included angle between two adjacently connected first branch electrode segments of the multiple first branch electrode segments is less than 180°.

15 Claims, 16 Drawing Sheets

(58) Field of Classification Search
USPC .................................................. 349/139–146
See application file for complete search history.

(56) References Cited

FOREIGN PATENT DOCUMENTS

| | | |
|---|---|---|
| CN | 102520545 A | 6/2012 |
| CN | 103309102 A | 9/2013 |
| CN | 104880872 A | 9/2015 |
| CN | 105446027 A | 3/2016 |
| CN | 106444171 A | 2/2017 |
| CN | 206209259 U | 5/2017 |
| CN | 107331315 A | 11/2017 |
| CN | 107402480 A | 11/2017 |
| IN | 107422549 A | 12/2017 |
| IN | 111650792 A | 9/2020 |
| JP | 2009053256 A | 3/2009 |
| KR | 20160144526 A | 12/2016 |

* cited by examiner

DISPLAY PANEL AND DISPLAY DEVICE

CROSS-REFERENCE TO RELATED APPLICATIONS

This is a National Stage Application, filed under 35 U.S.C. 371, of International Patent Application No. PCT/CN2020/129404, filed on Nov. 17, 2020, which is based on and claims priority to Chinese Patent Application No. 202011065937.9 filed with the China National Intellectual Property Administration (CNIPA) on Sep. 30, 2020, the disclosure of which is incorporated herein by reference in its entirety.

This application claims priority to Chinese Patent Application No. 202011065937.9 filed with the China National Intellectual Property Administration (CNIPA) on Sep. 30, 2020, the disclosure of which is incorporated herein by reference in its entirety.

TECHNICAL FIELD

The present disclosure relates to the field of display panels and, for example, to a display panel and a display device.

BACKGROUND

In the display field, liquid crystal molecules have aeolotropism. If the liquid crystal molecules at multiple positions in the pixel unit have a same deflection direction, at the time of viewing in different angles, the display difference in different viewing angles is caused since light passing through the liquid crystal molecules has different optical path differences. Therefore, in some display panels, the pixel unit is configured to have a dual-domain structure through designing the pixel electrode. The liquid crystal molecules in two domains in the pixel unit have different rotation directions, and in different viewing angle directions, viewing angles of the two domains may be complementary, thus solving the viewing angle problem in a horizontal direction or a vertical direction. Generally, a horizontal domain mode and a vertical domain mode are provided. At the time of viewing in the vertical viewing angle, due to the low efficiency of the liquid crystal in the horizontal domain mode, a contrast in the horizontal domain mode is lower than that in the vertical domain mode. However, at the time of viewing in a large squint viewing angle, a problem of light leakage in the dark state in the vertical domain mode is more serious than that in the horizontal domain mode, thus the contrast in the vertical domain mode is relatively low at the time of viewing in the large squint viewing angle.

The preceding two modes cannot meet the contrast requirements at the time of viewing in the vertical viewing angle and the large squint viewing angle. When the two modes are applied to the scenario of viewing in the large squint viewing angle, for example, when viewing the vehicular central control screen, the driver needs to view in the large squint viewing angle during driving. If the large squint viewing angle of the vehicular central control screen is relatively low, the image viewing and display effect of the vehicular central control screen will be seriously affected.

SUMMARY

The present disclosure provides a display panel and a display device for improving the contrast at the time of viewing in a vertical viewing angle and a large squint viewing angle.

A display panel is provided. The display panel includes multiple data lines and multiple scanning lines.

The multiple data lines intersect with the multiple scanning lines to define multiple pixel units arranged in an array, and the plurality of data lines are insulated from the plurality of scanning lines.

Pixel electrodes of pixel units in at least portion of the array include multiple first branch electrodes arranged in parallel; along an extension direction of the multiple scanning lines, each of the multiple first branch electrodes includes multiple first branch electrode segments connected sequentially; and an included angle between two adjacently connected first branch electrode segments is less than 180°.

A display device is further provided. The display device includes the preceding display panel.

DETAILED DESCRIPTION

The present disclosure will be described below in conjunction with the drawings and embodiments.

Figure 1:
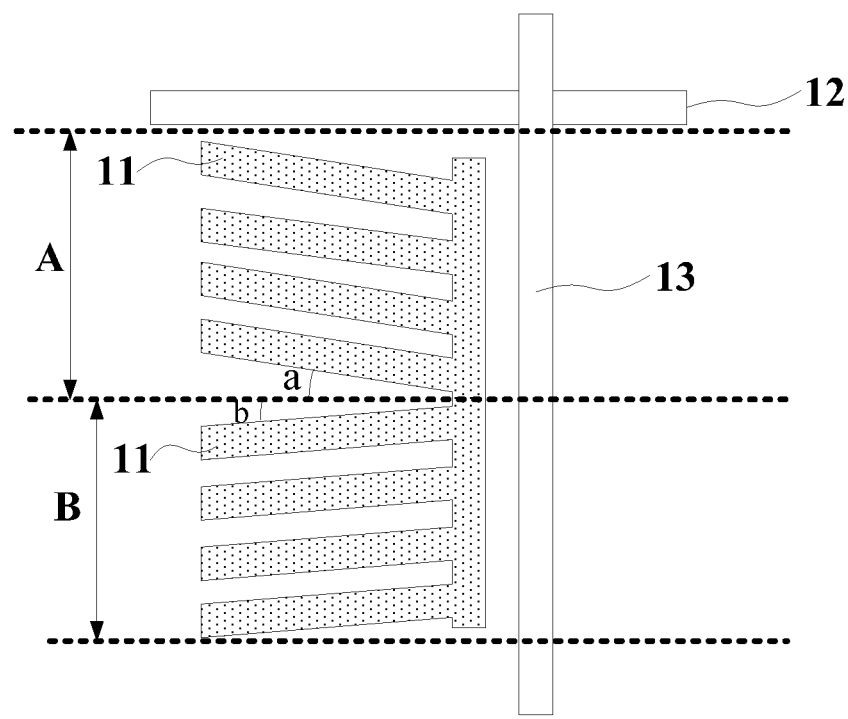
FIG. 1 is a diagram showing a design of a horizontal domain pixel provided in the related art.
Figure 2:
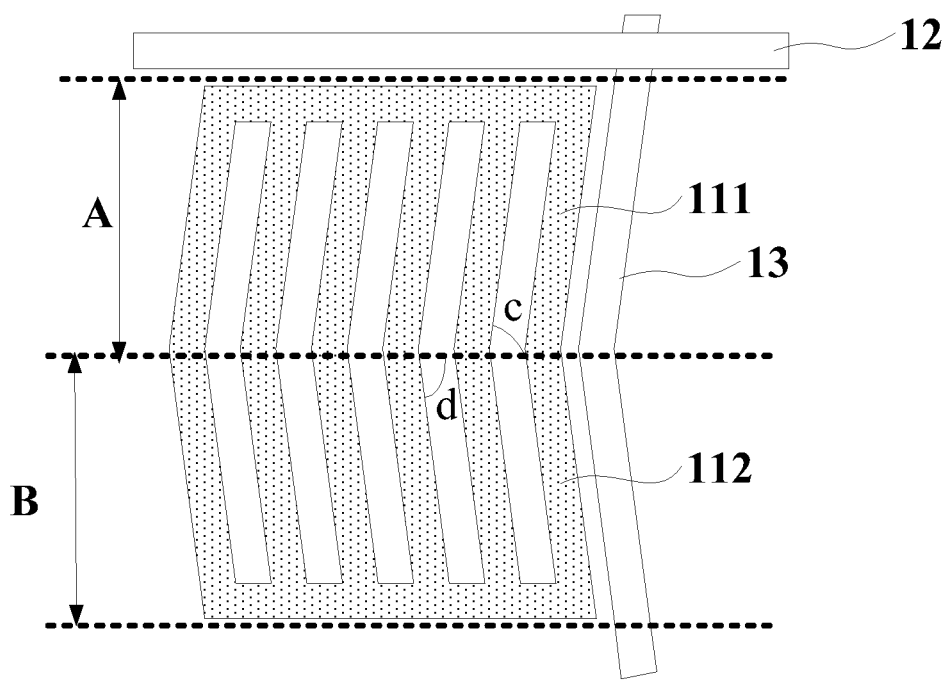
FIG. 2 is a diagram showing a design of a vertical domain pixel provided in the related art.

Since liquid crystal molecules have a long axis and a short axis, light passing through the display panel has different optical path differences when the deflection direction of the liquid crystal molecules is different, thereby causing the viewing angle of the display panel to have aeolotropism. Therefore, to enlarge the viewing angle of the display panel, a pixel design of dividing the pixel units into domains is proposed. A pattern of a pixel electrode in one pixel is presented in two reverse tilt parts. FIG. 1 is a diagram showing a design of a horizontal domain pixel provided in the related art. As shown in FIG. 1, the pixel electrode is configured to include multiple strip-shaped electrodes 11. Each of the multiple strip-shaped electrodes extends in an extension direction of scanning lines 12. In an extension direction of data lines 13, the pixel unit is divided into an area A and an area B. The multiple strip-shaped electrodes 11 in the area A are parallel to each other. The multiple strip-shaped electrodes 11 in the area B are parallel to each other. Each of the multiple strip-shaped electrodes 11 in the area A has an included angle a with the extension direction of the scanning line 12, and each of the multiple strip-shaped 11 in the area B has an included angle b with the extension direction of the scanning line 12. The strip-shaped electrodes 11 in the area A are symmetrical to the strip-shaped electrodes 11 in the area B with respect to the extension direction of the scanning line 12. The area A and the area B form two domains of one pixel unit. FIG. 2 is a diagram showing a design of a vertical domain pixel provided in the related art. Referring to FIG. 2, along an extension direction of data lines 13, a sub-pixel unit is divided into an area A and an area B. The pixel electrode is configured to include multiple strip-shaped electrodes 11. Each of multiple strip-shaped electrodes 11 is a V-shaped polyline. A polyline part 111 is disposed in the area A of the sub-pixel. A polyline part 112 is disposed in the area B of the sub-pixel, the polyline part 111 has an included angle c with an extension direction of scanning lines 12, and the polyline part 112 has an included angle d with the extension direction of the scanning line 12. In the horizontal domain pixel design in FIG. 1 and the vertical domain pixel design in FIG. 2, after a pixel voltage is applied, the liquid crystal molecules in the area A and the area B rotate in opposite directions, so that the viewing angles of the area A and the area B may be complementary in different viewing angle directions. Thus, the viewing angle of the display panel may be increased and the problem of color shift of the display panel may be improved.

Figure 3:
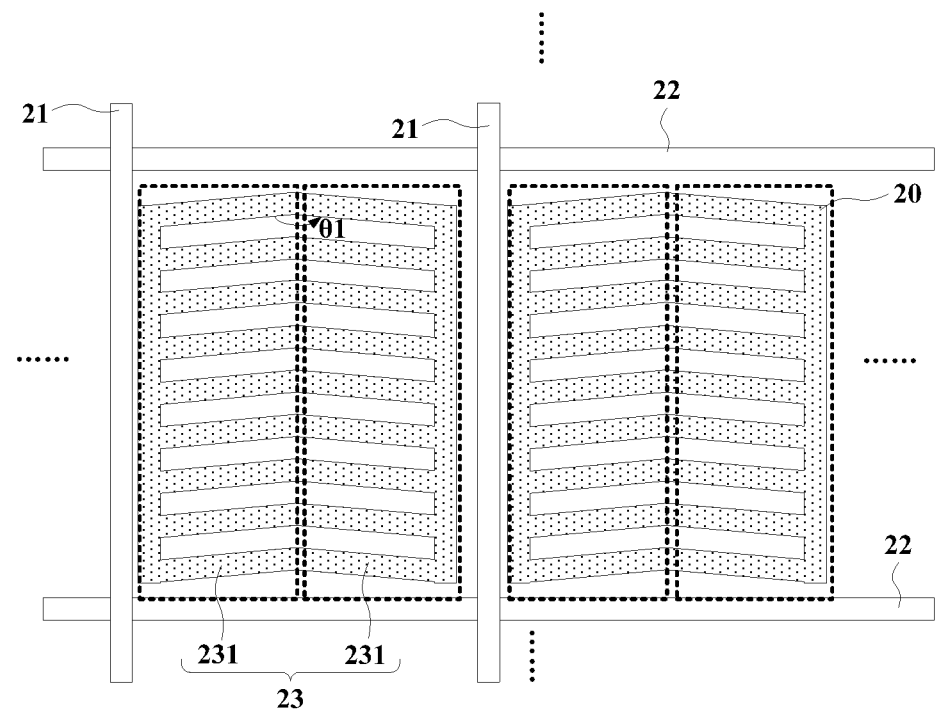
FIG. 3 is a structural diagram of a display panel provided by an embodiment of the present disclosure.

FIG. 3 is a structural diagram of a display panel provided by an embodiment of the present disclosure. Referring to FIG. 3, the display panel provided by the embodiment of the present disclosure provides multiple data lines 21 and multiple scanning lines 22. The multiple data lines 21 intersect with the multiple scanning lines 22 to define multiple pixel units (not shown in the figure) arranged in an array, and the multiple data lines 21 are insulated from the multiple scanning lines 22. The data line 21 is configured to provide a data signal to each pixel unit, and the scanning line 22 is configured to control a pixel circuit of a row of pixel units correspondingly connected to the scanning line 22 to be turned on or turned off.

In the embodiment of the present disclosure, pixel electrodes 20 of pixel units in at least part of the array is configured to include multiple first branch electrodes 23 arranged in parallel. Referring to FIG. 3, along an extension direction of the multiple scanning lines 22, each of the multiple first branch electrodes 23 includes multiple first branch electrode segments 231 connected sequentially. An included angle θ1 between two adjacently connected first branch electrode segments 231 is less than 180°. That is, the two adjacently connected first branch electrode segments 231 are not arranged in parallel, and the two adjacently connected first branch electrode segments 231 have an included angle, forming a V-shaped structure. Since the two adjacently connected first branch electrode segments 231 may control rotation directions of the liquid crystal molecules disposed close to a position where the two adjacently connected first branch electrode segments 231 are located to be different, a pixel domain is formed at the position where the two adjacently connected first branch electrode segments 231 is located, such as the area shown by a dashed-line box in FIG. 3. Exemplarily, in FIG. 3, the first branch electrode 23 is configured to include two first branch electrode segments 231 connected sequentially, i.e., the pixel unit shown in FIG. 3 includes two domains, which is a dual-domain structure. Different from FIGS. 1 and 2, in FIG. 3, it can be regarded that the vertical domain in FIG. 2 is placed horizontally.

In a case of viewing in the vertical viewing angle, due to the uncontrolled liquid crystal molecules, more black areas are formed in the horizontal domain pixel design, so that the liquid crystal efficiency of a horizontal axis is relatively low, which leads to the low contrast of the display panel. In a case of viewing in the large squint viewing angle, an optical path difference of the display panel with respect to a large angle outgoing light in the vertical domain pixel design is larger than an optical path difference of the display panel in the horizontal domain pixel design, thus the light leakage of the display panel in the vertical domain pixel design is more serious and the contrast of the display panel is relatively low in the case of viewing the display panel from the large squint viewing angle. The display panel provided by the embodiment of the present disclosure may integrate advantages of the horizontal domain pixel design and the vertical domain pixel design, that is, the pixel unit in the embodiment of the present disclosure is in a horizontally placed vertical domain pixel design, which can improve the contrast at the time of viewing in the vertical viewing angle and the large squint viewing angle simultaneously.

Table 1 shows display panel contrast test results of the horizontal domain pixel design and the vertical domain pixel design in the related art and the display panel (horizontally placed vertical domain pixel design) provided by the embodiment of the present disclosure. To quantify the influence of the horizontal domain pixel design, the vertical domain pixel design and the horizontally placed vertical domain pixel design on the contrast, the box thickness, the polarizer, the backlight and other structural design parameters of multiple display panels tested in Table 1 are same, and the domain orientation of the pixel electrodes is different, so that the tested display panels form a horizontal domain mode, a vertical domain mode or a vertical-domain-placed-horizontally mode.

TABLE 1

Display panel contrast test results of the horizontal domain pixel design and the vertical domain pixel design in the related art and the display panel (horizontally placed vertical domain pixel design) provided by the embodiment of the present disclosure

|  | Serial number | Vertical viewing angle contrast (CR) | Large squint viewing angle contrast S | S/CR |
|---|---|---|---|---|
| horizontally placed vertical domain pixel design | 1 | 1864 | 775 | 42% |
|  | 2 | 1901 | 800 | 42% |
|  | 3 | 1757 | 768 | 44% |
|  | Average value | 1841 | 781 | 43% |

TABLE 1-continued

Display panel contrast test results of the horizontal domain pixel design and the vertical domain pixel design in the related art and the display panel (horizontally placed vertical domain pixel design) provided by the embodiment of the present disclosure

|  | Serial number | Vertical viewing angle contrast (CR) | Large squint viewing angle contrast S | S/CR |
|---|---|---|---|---|
| Horizontal domain pixel design | 1 | 1734 | 681 | 39% |
|  | 2 | 1668 | 611 | 37% |
|  | 3 | 1604 | 613 | 38% |
|  | 4 | 1587 | 628 | 40% |
|  | 5 | 1612 | 612 | 38% |
|  | Average value | 1641 | 629 | 38% |
| Vertical domain pixel design | 1 | 1901 | 601 | 32% |
|  | 2 | 1732 | 542 | 31% |
|  | 3 | 1833 | 612 | 33% |
|  | Average value | 1822 | 585 | 32% |

The tested display panel in the horizontally placed vertical domain pixel design in Table 1 is arranged in the structure of the pixel electrodes in the preceding embodiment, thereby implementing the vertical-domain-placed-horizontally mode. The tested display panel in the horizontal domain pixel design in Table 1 is arranged in a structure similarly to the structure of the pixel electrodes in FIG. 1, thereby implementing the horizontal domain mode. The tested display panel in the vertical domain pixel design in Table 1 is arranged in a structure similarly to the structure of the pixel electrodes in FIG. 2, thereby implementing the vertical domain mode. Referring to Table 1, Table 1 tests three display panels in the horizontally placed vertical domain mode. An average value of a vertical viewing angle contrast CR is 1841, an average value of a large squint viewing angle contrast S is 781, and an average value of S/CR is 43%. Table 1 tests five display panels in the horizontal domain pixel mode. The average value of the vertical viewing angle contrast CR is 1641, the average value of the large squint viewing angle contrast S is 629, and the average value of S/CR is 38%. Table 1 tests three display panels in the vertical domain pixel mode. The average value of the vertical viewing angle contrast CR is 1822, the average value of the large squint viewing angle contrast S is 585, and the average value of S/CR is 32%. According to the test results, it can be known that the average value of the vertical viewing angle contrast CR, the average value of large squint viewing angle contrast S and the average value of S/CR of the display panel (which is in the horizontal domain pixel design) provided by the embodiment of the present disclosure are the largest in the three modes.

Optionally, in the embodiment of the present disclosure, the scanning line may be configured as a straight line. Referring to FIG. 3, the scanning line 21 may be a straight line without changing a manufacturing process of the panel and a preparation mask of the scanning line. If the display panel in the horizontally placed vertical domain design provided by the embodiment of the present disclosure is designed to have a same size as the pixel unit in the vertical domain pixel design, the display panel may have a same pixel aperture ratio as the pixel unit in the vertical domain pixel design. That is, in the horizontally placed vertical domain design, the pixel opening ratio of the display panel is not reduced.

Based on the preceding embodiment, the display panel provided by the embodiment of the present disclosure further includes a black matrix. For example, referring to FIG. 4, the black matrix 30 includes multiple openings 31. A vertical projection of a pixel electrode 20 onto a plane where the black matrix 30 is located overlaps the multiple openings 31 of the black matrix. A pixel unit further includes a pixel circuit (e.g., a transistor in FIG. 4). The pixel circuit is configured to provide a data signal input from a data line for a pixel electrode of the pixel unit after acquiring an effective level through a scanning line. The black matrix is configured to block the pixel circuit, the data line and the scanning line in the display panel to avoid the light leakage. Along an extension direction of the data lines, in the black matrix 30, a first portion 32 and a second portion 33 are included between adjacent openings 31. Along the extension direction of the data lines 21, a width of the first portion 32 is greater than a width of the second portion 33. A vertical projection of the pixel circuit onto the plane where the black matrix 30 is located is within the first portion 32. The width of the first portion 32 refers to a length of the first portion 32 in the extension direction of the data lines 21.

Figure 4:
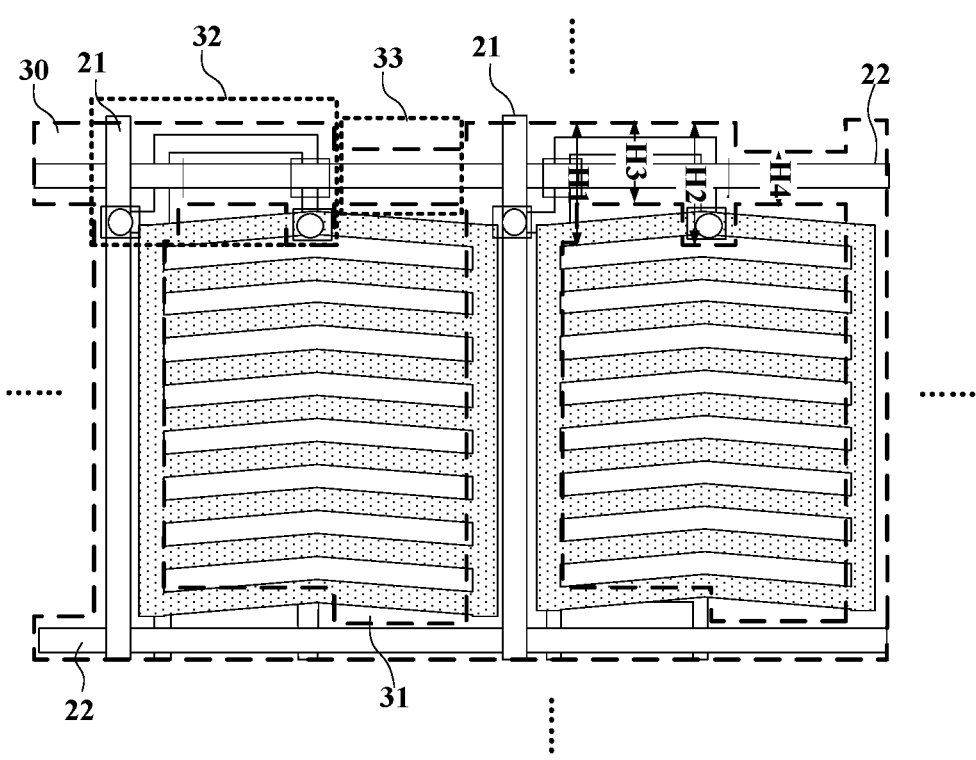
FIG. 4 is a structural diagram of another display panel provided by an embodiment of the present disclosure.

Referring to FIG. 4, the width of the first portion 32 corresponding to a connection between the pixel circuit and the data line 21 is H1, the width of the first portion 32 corresponding to the connection between the pixel circuit and the pixel electrode 20 is H2, and the width of the first portion 32 corresponding to an active layer of the pixel circuit is H3. The widths (H1, H2 and H3) of the first portion 32 are all larger than the width H4 of the second portion 33. For example, referring to FIG. 4, since the pixel circuit occupies portion of the space, a contour covering the black matrix above the pixel circuit may be configured to be same as the pixel circuit. In a position where the pixel circuit is not arranged, for example, a position where just the data line or the scanning line is arranged, the width of the black matrix may be reduced as long as a signal line such as the data line or the scanning line below the black matrix is covered. In this way, the width of the portion of the black matrix where the pixel circuit is not arranged may be reduced, thereby increasing the opening of the black matrix, improving the pixel opening ratio and the transmittance.

Figure 5:
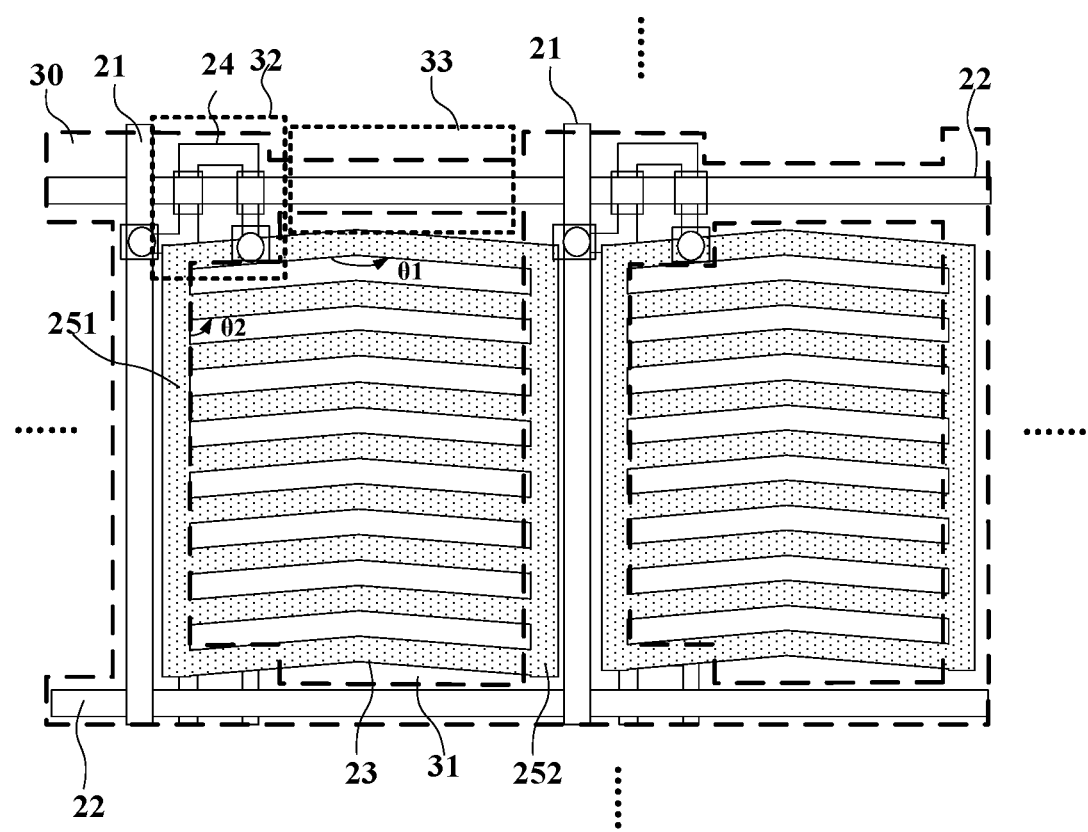
FIG. 5 is a structural diagram of another display panel provided by an embodiment of the present disclosure.

Optionally, the pixel circuit may be configured to be disposed at a corner of an area defined by the multiple data lines intersecting with the multiple scanning lines, and the multiple data lines are insulated from the multiple scanning lines. FIG. 5 is a structural diagram of another display panel according to an embodiment of the present disclosure. As shown in FIG. 5, a pixel circuit 24 is disposed at a corner of an area defined by multiple data lines 21 intersecting with multiple scanning lines 22, and the data lines 21 are insulated from the scanning lines 22. With such arrangement, a length of an active layer of a transistor in the pixel circuit may be shortened, more space may be saved for providing openings of a black matrix, thereby arranging more first branch electrodes and improving the transmittance of the pixel unit. Referring to FIG. 5, in the display panel provided by the embodiment of the present disclosure, a width of the first portion 32 of the black matrix 30 at a position where the pixel circuit is located may also be configured to be larger than a width of the second portion 33 of the black matrix 30. FIG. 5 illustrates that the pixel circuit is arranged at an upper-left corner of the area defined by the data lines 21 intersecting with the scanning lines 22, the data lines 21 are insulated from the scanning lines 22, which is not limited in the embodiment of the present disclosure. In other embodiments, the pixel circuit may be arranged at a position of other corners, such as an upper-right corner of the area defined by the data lines intersecting with the scanning lines according to actual needs, and the data line are insulated from the scanning lines.

Optionally, an embodiment of the present disclosure also provides design structures of multiple pixel electrodes. For example, as shown in FIG. 5, the pixel electrode may further include a first terminal electrode 251 and a second terminal electrode 252. The first terminal electrode 251 and the second terminal electrode 252 extend along the extension direction of the data lines 21. The first terminal electrode 252 is disposed between the data line 21 and first terminals of the first branch electrodes 23. The second terminal electrode 252 is disposed between the data line 21 and second terminals of the first branch electrodes 23. The first terminal electrode 251 and the second terminal electrode 252 electrically connect multiple first branch electrodes 23 in the pixel unit so that the entire pixel electrode can maintain a same potential.

Based on the preceding embodiments, optionally, a range of an included angle $\theta_1$ between adjacent first branch electrode segments 231 in a same first branch electrode may be configured to be, for example, 120°±15°. A range of an included angle $\theta_2$ between the first branch electrode and the terminal electrode may be configured to be, for example, 60°±15°. If the angle is too large, the pressing pattern cannot be recovered after pressing the panel. If the included angle is excessive small, the uncontrolled liquid crystal area is increased and the transmittance of the pixel unit is influenced. In view of the preceding factors comprehensively, the included angle θ1 between adjacent first electrode segments 231 in the same first electrode is configured to be 120°±15°, and the included angle $\theta_2$ between the first electrode and the terminal electrode is configured to be 60°±15°, high contrast may be implemented at the time of viewing in both the vertical viewing angle and the large squint viewing angle.

Figure 6:
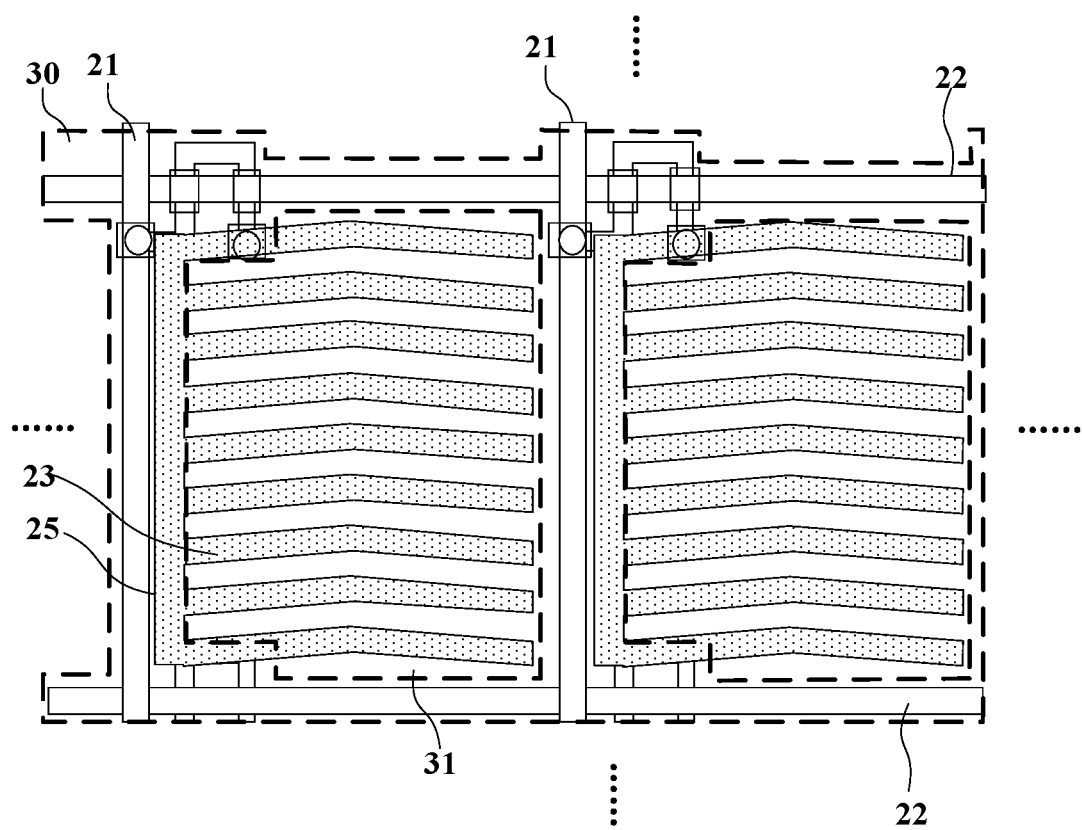
FIG. 6 is a structural diagram of another display panel provided by an embodiment of the present disclosure.

Referring to FIG. 6, for example, each of the pixel electrodes 20 may further include one terminal electrode 25. The terminal electrode 25 extends in a direction of data lines 21. The terminal electrode 25 is disposed between the data line 21 and the first branch electrodes 23. First terminals of multiple first branch electrodes 23 in the pixel unit are electrically connected to the terminal electrode 25. Second terminals of the first branch electrodes 23 are configured in a floating state. Since the terminal electrode and the first branch electrode have different extension directions, the liquid crystal at a connection portion of the terminal electrode and the first branch electrode is restricted by deflections of two directions, so that the light deflection direction cannot be changed at the connection portion, thus there is a certain area of a black area at this position. In the display panel provided by the embodiment of the present disclosure, the pixel electrode of the pixel unit may include just one terminal electrode, for example, the terminal electrode 25 is arranged on a left side of the first branch electrodes 23 in FIG. 6, and no terminal electrode is arranged on a right side of the first branch electrodes 23. With such arrangement, the area of the black area can be effectively reduced and the transmittance of the pixel unit is improved.

Figure 7:
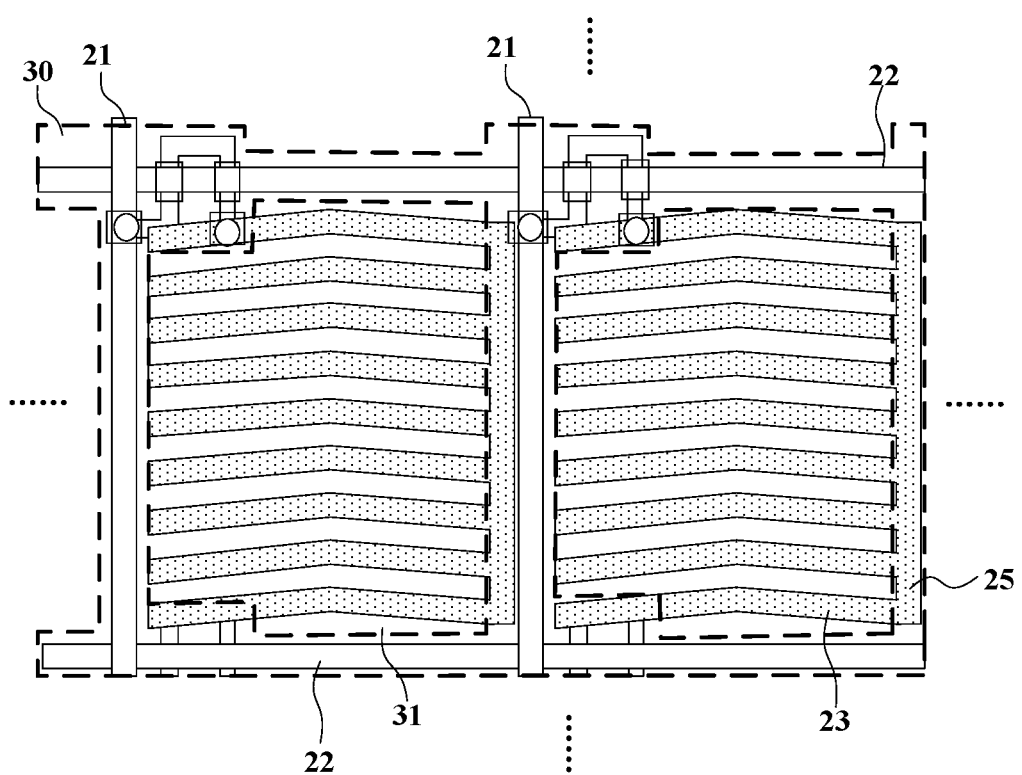
FIG. 7 is a structural diagram of another display panel provided by an embodiment of the present disclosure.

Optionally, referring to FIG. 7, second terminals of multiple first branch electrodes 23 in a pixel unit may be electrically connected to a terminal electrode 25, and first terminals of the first branch electrodes 23 are configured in a floating state.

Referring to FIG. 7, the terminal electrode 25 is arranged on a right side of the first branch electrodes 23, and no terminal electrode is arranged on a left side of the first branch electrodes 23, which can also effectively reduce the area of the black area and improve the transmittance of the pixel unit.

The second terminals or the first terminals of the first branch electrodes 23 are configured in a floating state means that the second terminals or the first terminals of the first branch electrodes 23 are not electrically connected to other conductive film layers.

Figure 8:
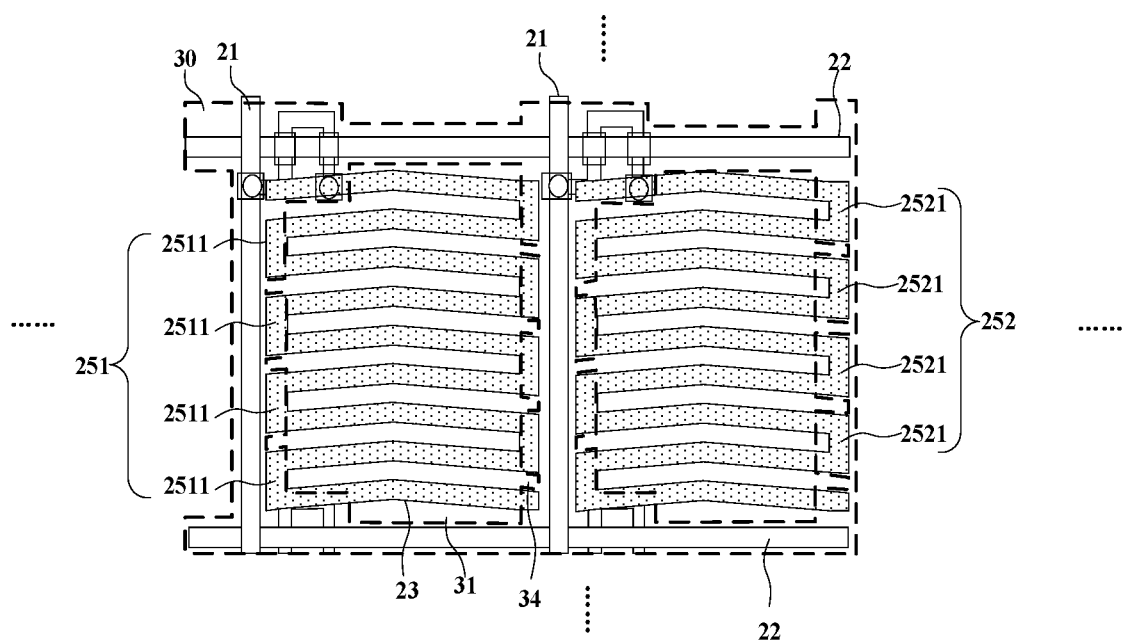
FIG. 8 is a structural diagram of another display panel provided by an embodiment of the present disclosure.

Optionally, referring to FIG. 8, a first terminal electrode 251 may also include multiple first terminal electrode segments 2511. A second terminal electrode 252 includes multiple second terminal electrode segments 2521. Among N first branch electrodes 23 sequentially arranged along a direction of multiple data lines 21, every three adjacent first branch electrodes are configured as an i-th first branch electrode, an (i+1)-th first branch electrode and an (i+2)-th first branch electrode. A first terminal of the i-th first branch electrode is electrically connected to a first terminal of the (i+1)-th first branch electrode through one of the multiple first terminal electrode segments 2511, and a second terminal of the (i+1)-th first branch electrode is electrically connected to a second terminal of the (i+2)-th first branch electrode through one of the multiple second terminal electrode segments 2521, where N is a positive integer greater than 2, i is a positive integer greater than or equal to 1 and less than or equal to (N−2). The design of the first terminal electrode and the second terminal electrode enables the whole pixel electrode to be arranged in a serpentine shape, and continuous terminal electrodes are arranged on left and right sides of the first branch electrodes. The pixel electrode design provided by the embodiment of the present disclosure can further reduce the black area and improve the transmittance of the pixel unit. The number of first branch electrodes in the pixel unit is not limited in the embodiment of the present disclosure, and FIG. 8 just exemplarily illustrates that each pixel unit includes nine first electrodes 23. In other embodiments, a suitable number of first branch electrodes can be designed according to the requirements, such as the size of the pixel unit or the like.

Figure 9:
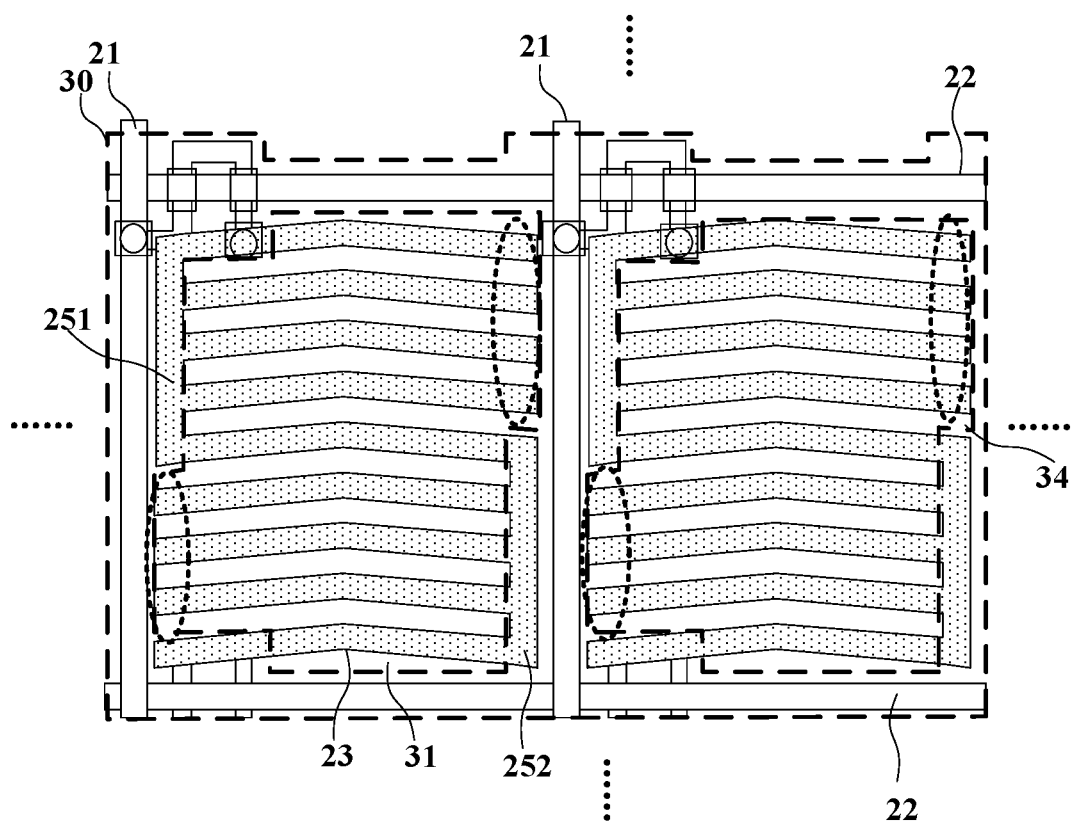
FIG. 9 is a structural diagram of another display panel provided by an embodiment of the present disclosure.

Optionally, referring to FIG. 9, among N first branch electrodes sequentially arranged along an extension direction of multiple data lines 21, first terminals of a first branch electrode 23 to an i-th first branch electrode 23 are electrically connected through the first terminal electrode 251, and second terminals of the first branch electrode 23 to an (i−1) first branch electrode 23 are configured in a floating state. The second terminals of the i-th first branch electrode 23 to an N-th first branch electrode 23 are electrically connected through the second terminal electrode 252, and the first terminals of an (i+1)-th first branch electrode 23 to the N-th first branch electrode 23 are configured in a floating state, where N is a positive integer greater than 2, and i is a positive integer greater than 1 and less than (N−1). Referring to FIG. 9, a first terminal electrode 251 and a second terminal electrode 252 form a left-right alternating structure, a partial number of first branch electrodes 23 are electrically connected through the first terminal electrode 251, and a partial number of first branch electrodes 23 are electrically connected through the second terminal electrode 252. Positions where the terminal electrodes are not arranged on the left and right sides of the first branch electrodes 23 (for example, positions shown by ellipse dashed frames in FIG. 9) have no black area, so that to a certain extent, the transmittance of the pixel unit can also be improved. Exemplarily, in FIG. 9, each pixel electrode includes nine first branch electrodes 23 and first terminals of the first branch electrode 23 to a fifth first branch electrode 23 are electrically connected through the first terminal electrode 251, and second terminals of the first branch electrode 23 to a fourth first branch electrode 23 are configured in a floating state. Second terminals of the fifth first branch electrode 23 to a ninth first branch electrode 23 are electrically connected through the second terminal electrode 252, and first terminals of a sixth first branch electrode 23 to the ninth first branch electrode 23 are configured in a floating state.

The first terminal of the first branch electrode and the second terminal of the first branch electrode are opposite ends, and exemplarily, in FIG. 9, a left end of the first branch electrode 23 is defined as the first terminal of the first branch electrode and a right end of the first branch electrode 23 is defined as the second terminal of the first branch electrode, which is not limited to the embodiment of the present disclosure. In other embodiments, the left end of the first branch electrode may also be defined as the second terminal of the first branch electrode, and the right end of the first branch electrode may be defined as the first terminal of the first branch electrode. Optionally, based on the preceding embodiments, referring to FIG. 8 or 9, when the black matrix 30 is arranged on the display panel, openings arranged in the black matrix 30 overlaps a vertical projection of the pixel electrode 20 onto a plane where the black matrix 30 is located. Along a direction of scanning lines 22, notches 34 are provided between adjacent openings 31 in the black matrix 30. Vertical projections of the terminal electrodes (the first terminal electrode 251 and the second terminal electrode 252) on a plane where the black matrix 30 is located are within the black matrix 30. Since the liquid crystal at a connection of the terminal electrode and the first branch electrode is restricted by the deflection of two directions, so that the light deflection direction cannot be changed at this position, thus there is a certain area of a black area at this position. Therefore, the vertical projection of the terminal electrodes on the plane where the black matrix 30 is located are within the black matrix 30, so that the black matrix 30 just blocks the black areas on the left and right sides of the first branch electrodes 23. As shown in FIG. 8, edges of the black matrix 30 are serrated. As shown in FIG. 9, one end of each of the first branch electrodes 23 not being unconnected to the terminal electrode may extend to a position of the notch 34. That is, the black matrix 30 just blocks the black areas generated by the terminal electrodes on the left and right sides of the first branch electrodes 23, thereby further improving the opening ratio of the pixel unit and the transmittance.

Figure 10:
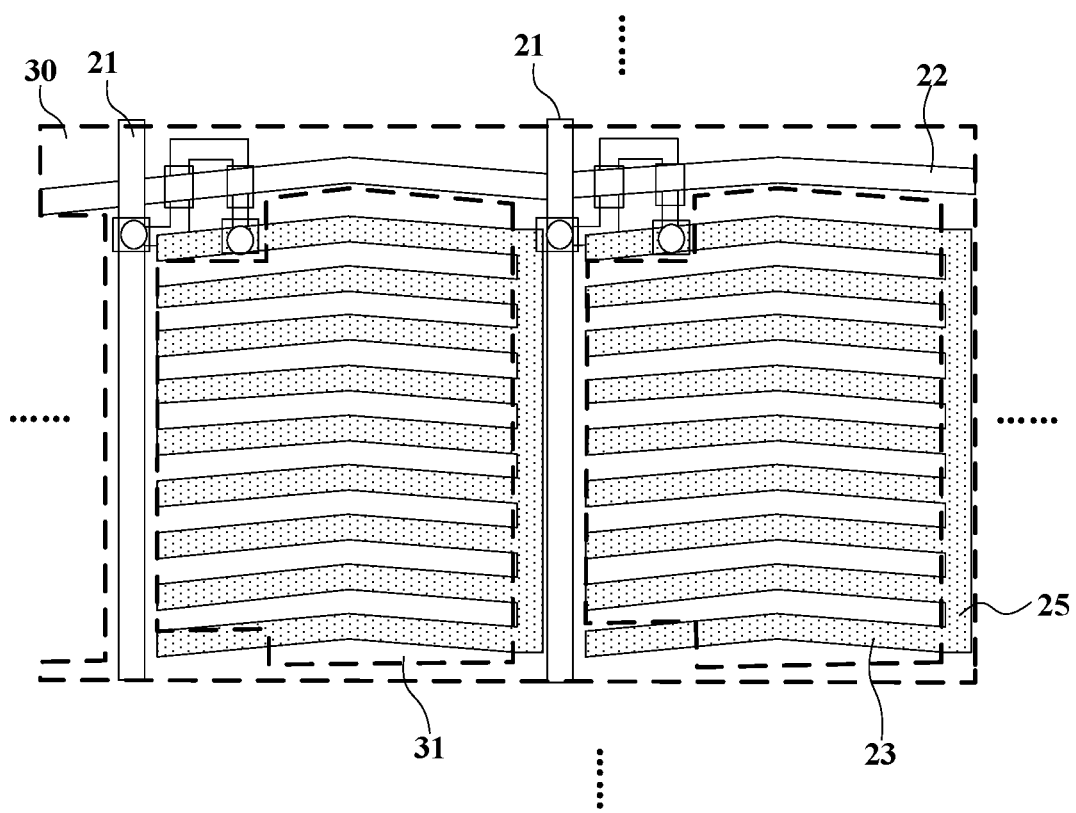
FIG. 10 is a structural diagram of another display panel provided by an embodiment of the present disclosure.

Optionally, in the embodiment of the present disclosure, the scanning line may be configured to be parallel to the extension direction of the first branch electrode. FIG. 10 is a structural diagram of another display panel provided by an embodiment of the present disclosure. As shown in FIG. 10, scanning lines 22 is parallel to an extension direction of first branch electrodes 23, and the scanning lines 22 and the first branch electrodes 23 have a same bending direction, so that the arrangement between the first branch electrodes, the scanning lines, the pixel circuit and the like can be more compact, and the opening ratio of the pixel unit may be further improved.

Figure 11:
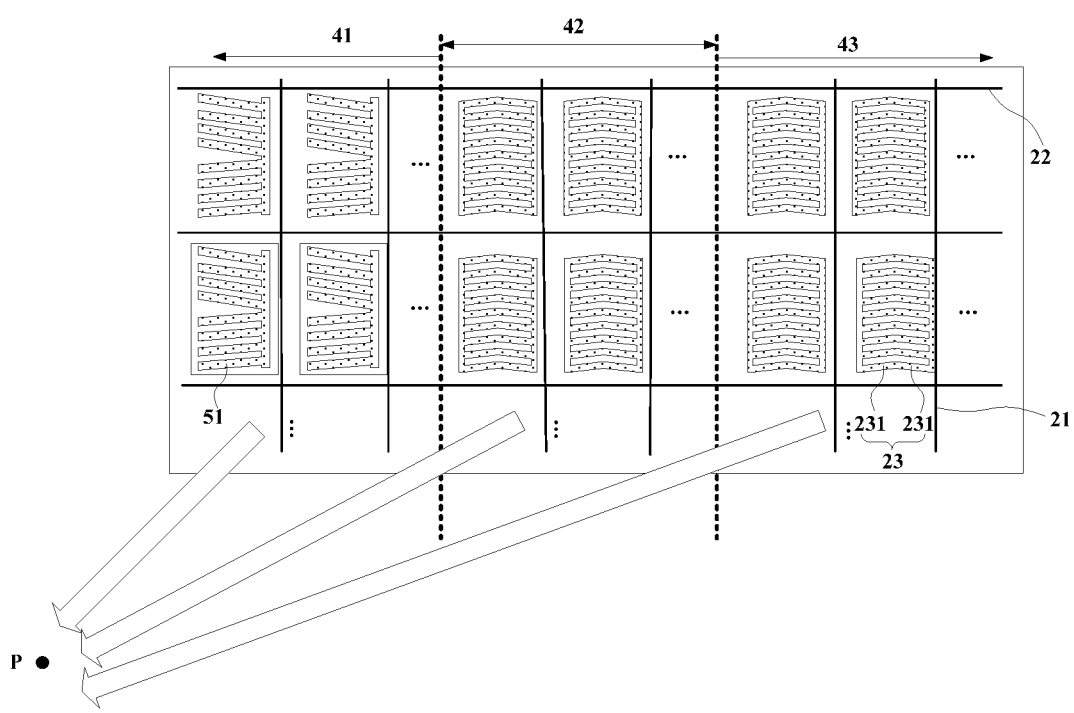
FIG. 11 is a structural diagram of another display panel provided by an embodiment of the present disclosure.

Optionally, based on the preceding embodiments, FIG. 11 is a structural diagram of another display panel provided by an embodiment of the present disclosure. As shown in FIG. 11, along an extension direction of scanning lines 22, the display panel includes a first area 41, a second area 42 and a third area 43 sequentially arranged, and the first area 41 is an area closest to a viewer P.

A pixel electrode of a pixel unit in the second area 42 and the third area 43 include multiple first branch electrodes 23 arranged in parallel. Along the extension direction of the scanning lines 22, each of the multiple first branch electrodes 23 includes multiple first branch electrode segments 231 sequentially connected. An included angle between adjacently connected first branch electrode segments of the multiple first branch electrode segments 231 is less than 180°. The pixel electrodes in the second area 42 and the third area 43 are in a horizontally placed vertical domain pixel design. A pixel electrode of a pixel unit in the first area 41 includes M second branch electrodes 51 sequentially arranged along an extension direction of the data lines 21. Along the extension direction of the data lines 21, second branch electrodes numbered from a first second branch electrode to a j-th second branch electrode of the M second branch electrodes are in parallel; second branch electrodes numbered from a (j+1)-th second branch electrode to an M-th second branch electrode of the M second branch electrodes are in parallel; and an included angle between the j-th second branch electrode and the (j+1)-th second branch electrode is less than 180°. M is a positive integer greater than 2, and j is a positive integer greater than 1 and less than (M−1). The pixel electrodes in the first area 41 are in a vertical domain pixel design.

In some scenarios which usually need to view from the large squint viewing angle, such as when viewing on a vehicular central control screen, the driver is generally located on a left side of the vehicular central control screen and needs to squint at the in-vehicle control screen frequently. Referring to FIG. 11, for example, the first area 41 is an area closest to the viewer P. A squint angle of the first area 41 is smaller than squint angles of the second area 42 and the third area 43. Therefore, a requirement of the first area 41 for the vertical viewing angle contrast is lower than requirements of the second area 42 and the third area 43 for the vertical viewing angle contrast, so that the horizontal domain pixel design may be adopted, and the horizontally placed vertical domain pixel design can be adopted in the second area 42 and the third area 43, so as to improve the vertical viewing angle contrast CR, the large squint viewing angle contrast S and CR/S, and enhance the viewing experience.

Optionally, based on the preceding embodiments, the first branch electrodes of adjacent pixel units in a same column may be configured to be symmetrical with respect to a row direction of the array; and/or the first branch electrodes of adjacent pixel units in a same row are centrosymmetric. The extension direction of the data lines is a column direction of the array of the pixel units. The extension direction of the scanning lines is the row direction of the array of the pixel units.

Figure 12:
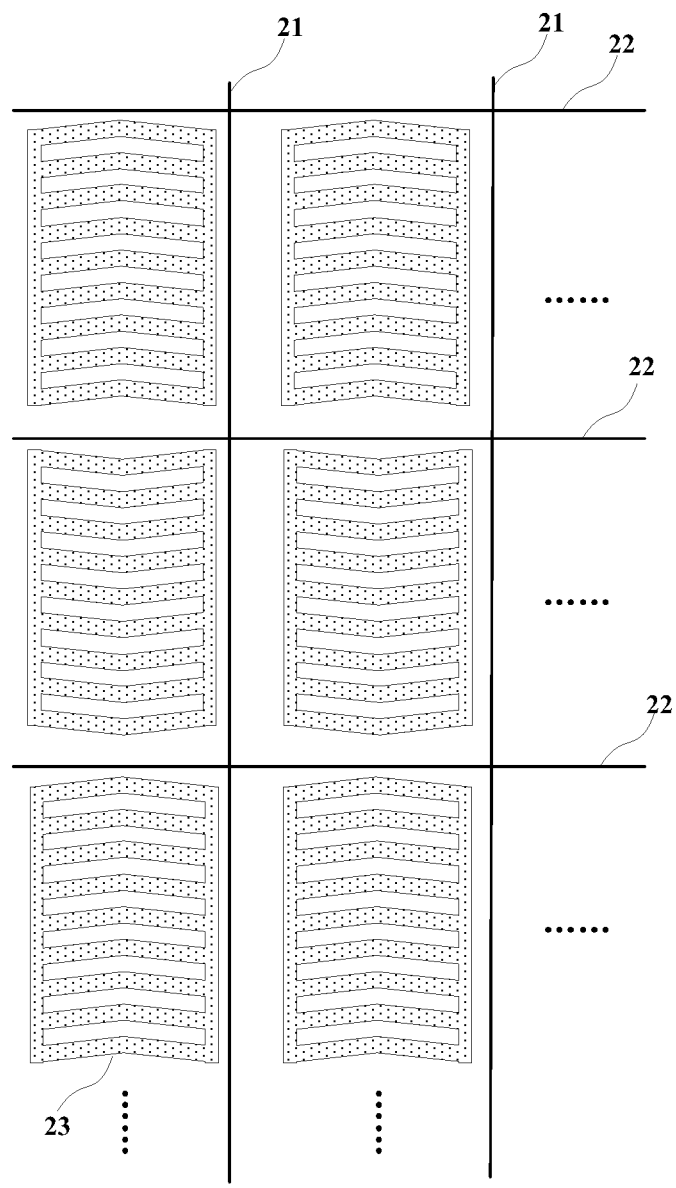
FIG. 12 is a structural diagram of another display panel provided by an embodiment of the present disclosure.

FIG. 12 is a structural diagram of another display panel provided by an embodiment of the present disclosure. As shown in FIG. 12, first branch electrodes 23 of adjacent pixel units in a same column are symmetrical with respect to a row direction of an array.

Figure 13:
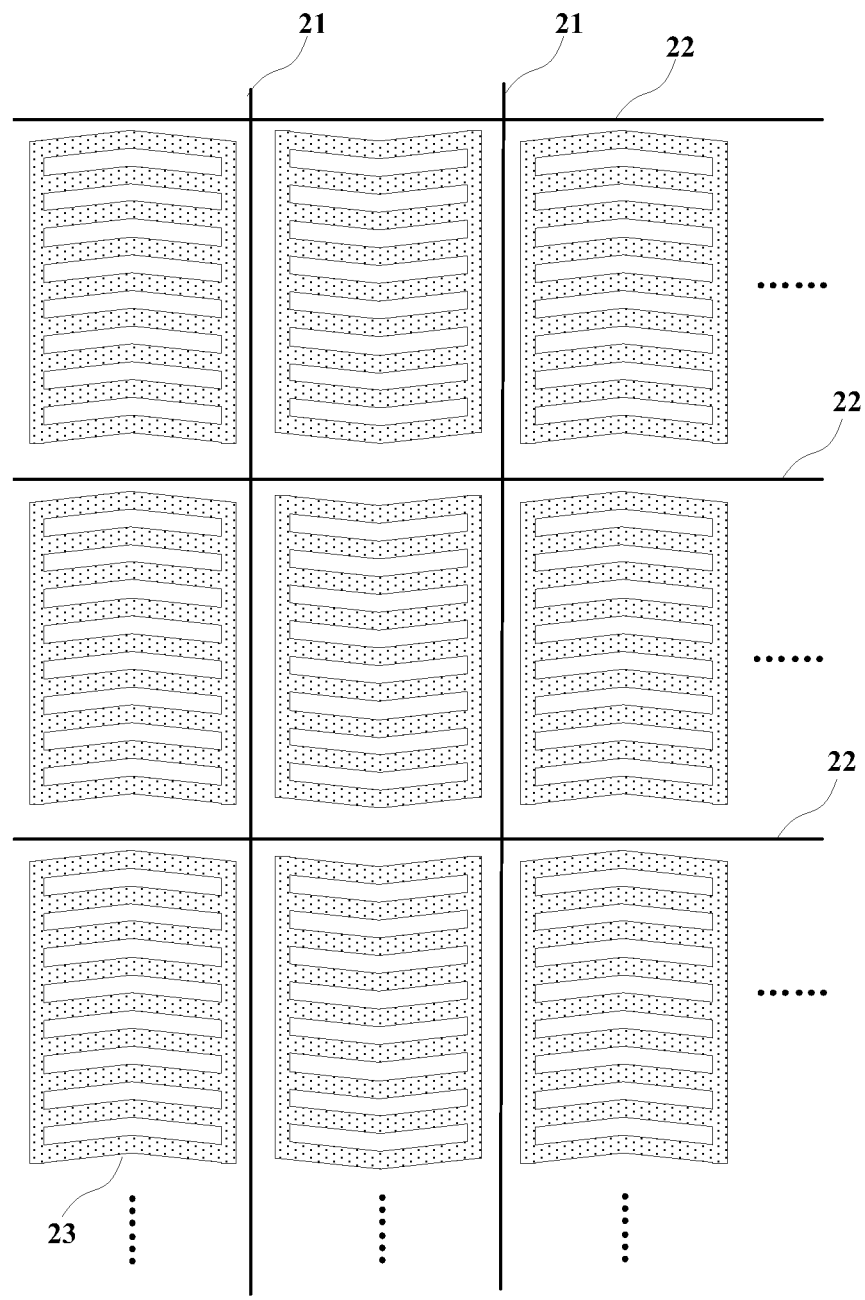
FIG. 13 is a structural diagram of another display panel provided by an embodiment of the present disclosure.

FIG. 13 is a structural diagram of another display panel provided by an embodiment of the present disclosure. As shown in FIG. 13, first branch electrodes 23 of adjacent pixel units in a same row are centrosymmetric.

Figure 14:
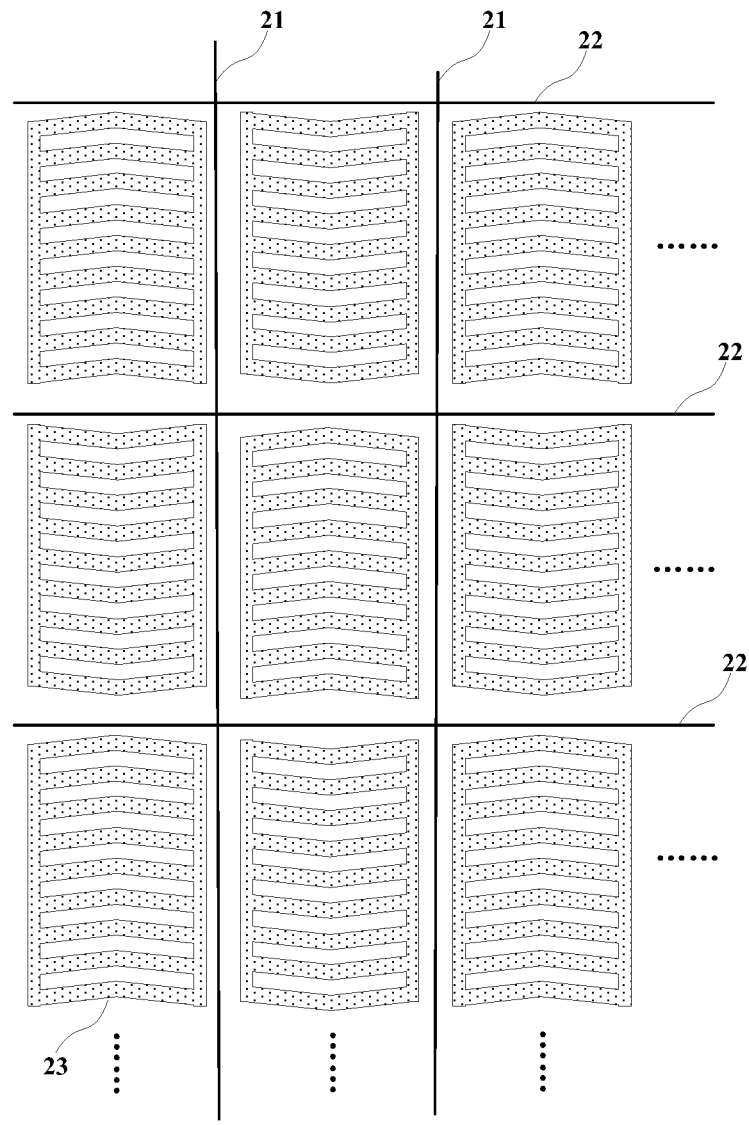
FIG. 14 is a structural diagram of another display panel provided by an embodiment of the present disclosure.

FIG. 14 is a structural diagram of another display panel provided by an embodiment of the present disclosure. As shown in FIG. 14, first branch electrodes 23 of adjacent pixel units in a same row are centrosymmetric and first branch electrodes 23 of adjacent pixel units in a same column are symmetrical with respect to a row direction of an array.

The first branch electrodes of the adjacent pixel units in the same column are configured to be symmetrical with respect to the row direction of the array, so that liquid crystal molecules of the adjacent pixel units in the same column can rotate in opposite directions, and the viewing angle of the display panel can be further increased. Similarly, the first branch electrodes of the adjacent pixel units in the same row are configured to be centrosymmetric, so that liquid crystal molecules of the adjacent pixel units in the same row can rotate in opposite directions, and the viewing angle of the display panel can be further increased.

The method provided by the embodiment of the present disclosure may be applied to display panels with various structures, such as a display panel adopting a positive liquid crystal or a negative liquid crystal. It can also be in plane switching (IPS) with a wide viewing angle or a fringe field switching (FFS). A transverse electric field generated between a pixel electrode and a common electrode is used for controlling the liquid crystal molecules to rotate in a plane parallel to the display panel to increase the viewing angle of the display panel.

Figure 15:
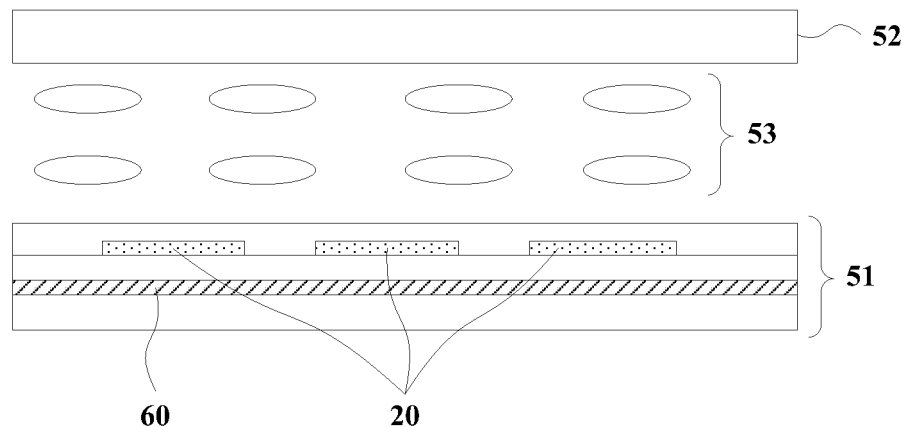
FIG. 15 is a structural diagram of another display panel provided by an embodiment of the present disclosure.

FIG. 15 is a structural diagram of another display panel provided by an embodiment of the present disclosure. As shown in FIG. 15, the display panel includes an array substrate 51 and a color filter substrate 52 disposed opposite to each other; and a liquid crystal layer 53 disposed between the array substrate 51 and the color filter substrate 52; and the pixel electrodes 20 are disposed in the array substrate 51; and the array substrate 51 also includes a common electrode 60 insulated from the pixel electrodes 20. The pixel electrodes 20 and the common electrode 60 are arranged in different layers to implement an FFS mode.

Figure 16:
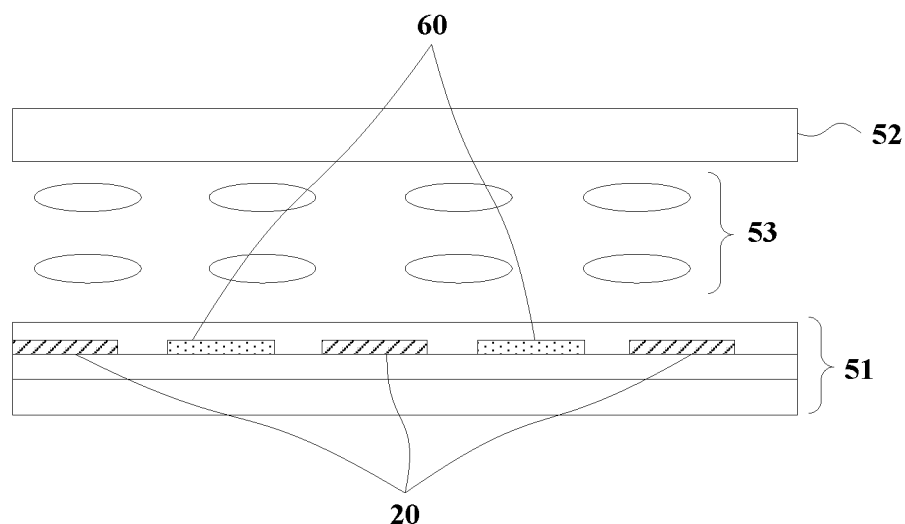
FIG. 16 is a structural diagram of another display panel provided by an embodiment of the present disclosure.

FIG. 16 is a structural diagram of another display panel provided by an embodiment of the present disclosure. As shown in FIG. 15, the display panel includes an array substrate 51 and a color filter substrate 52 disposed opposite to each other; and a liquid crystal layer 53 disposed between the array substrate 51 and the color filter substrate 52; and the pixel electrodes 20 are disposed in the array substrate 51; and the array substrate 51 also includes a common electrode 60 insulated from the pixel electrodes 20. The pixel electrodes 20 and the common electrode 60 are arranged at intervals in a same layer to implement an IPS mode.

In a case of viewing in a squint direction, a projection axis of a first polarizer, an absorption axis of a second polarizer and an optical axis of liquid crystal molecules are all deflected, and light entering from the first polarizer cannot be completely absorbed by the absorption axis of the second polarizer after being acted by the liquid crystal molecules, resulting in light leakage and poor squint contrast, and affecting the display quality. To improve the contrast in the squint direction so as to expand the viewing angle of the display panel, an optical compensation film is arranged between the first polarizer and the array substrate in the embodiment of the present disclosure.

Figure 17:
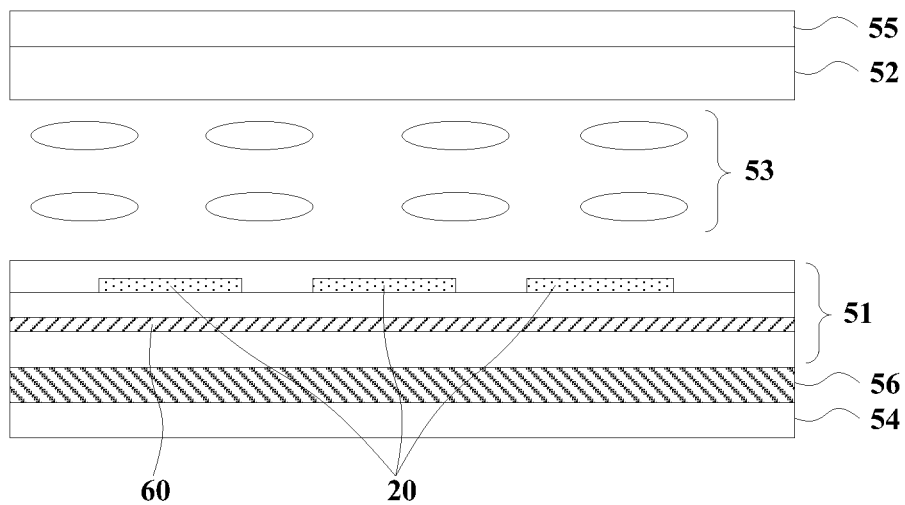
FIG. 17 is a structural diagram of another display panel provided by an embodiment of the present disclosure.

Taking the display panel in an FFS mode as an example, for example, referring to FIG. 17, based on the preceding embodiments, the display panel provided by the embodiment of the present disclosure may further include a first polarizer 54 disposed on one side of an array substrate 51 facing away from a color filter substrate 52, a second polarizer 55 disposed on one side of the color filter substrate 52 facing away from the array substrate 51, and an optical compensation film 56 disposed between the first polarizer 54 and the array substrate 51. The optical compensation film 56 is configured to reduce a phase delay of the liquid crystal layer with respect to light. The optical compensation film 56 can change a phase of the transmitted light, thereby counteracting the phase delay of the light caused by the liquid crystal molecules, thereby enlarging the viewing angle of the display panel.

Although the domain structure of the pixel units can improve the viewing angle, at a junction of two domains of the pixel units, the liquid crystal molecules are affected by the electric field formed by the pixel electrodes in the two domains and cannot rotate, so the liquid crystal molecules at the junction of the two domains cannot change the light deflection direction, and finally the light cannot be transmitted at gray scales in addition to a zero-order gray scale, that is, a black line is generated at the junction of the two domains. Similarly, the liquid crystal molecules close to the junction of the two domains are subjected to similar forces of the pixel electrodes between the two domains, thus the liquid crystal molecules are also affected and difficult to rotate.

Figure 18:
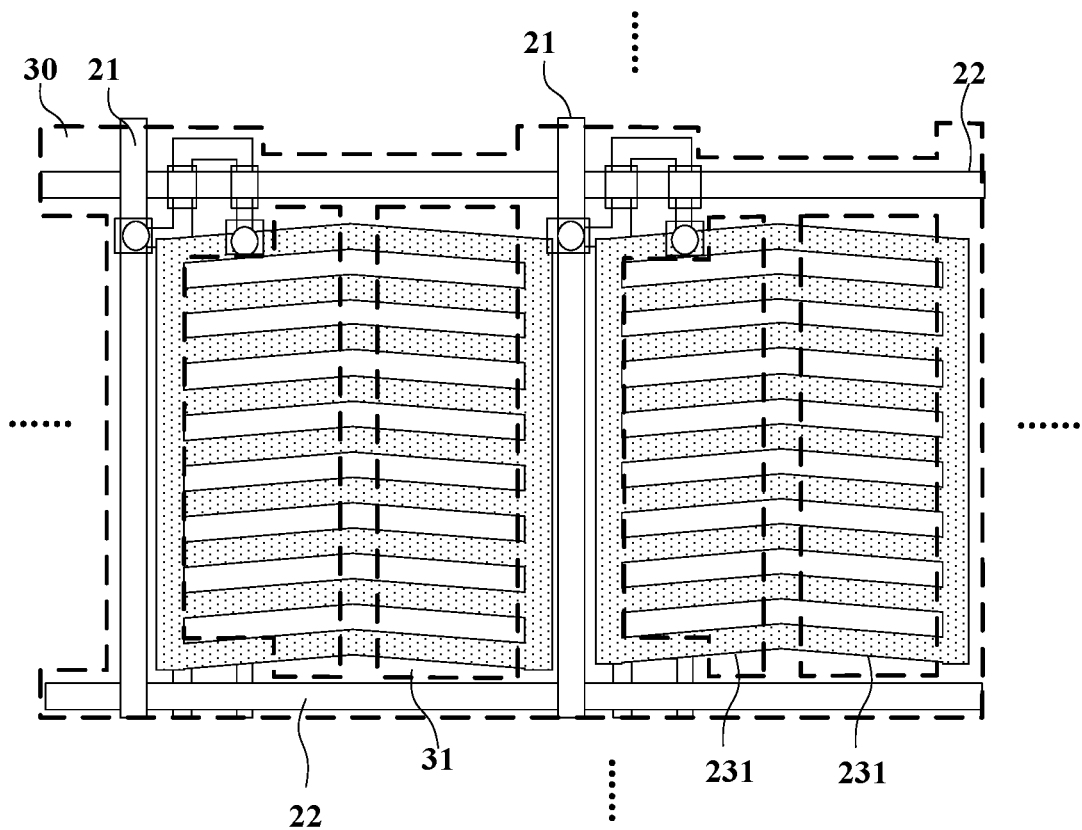
FIG. 18 is a structural diagram of another display panel provided by an embodiment of the present disclosure.

The junction of the two domains has a certain area of a black area, which reduces the light transmittance of the display panel. In view of the above, the display panel provided by the embodiment of the present disclosure is provided with a black matrix. For example, referring to FIG. 18, the black matrix 30 includes multiple openings 31. A vertical projection of the pixel electrode 20 onto a plane where the black matrix 30 is located overlaps the multiple openings of the black matrix 30, and a vertical projection of a connection of adjacent first branch electrode segments 231 of the multiple first branch electrode segments in a plane where the black matrix 30 is located is disposed in the black matrix 30.

Figure 19:
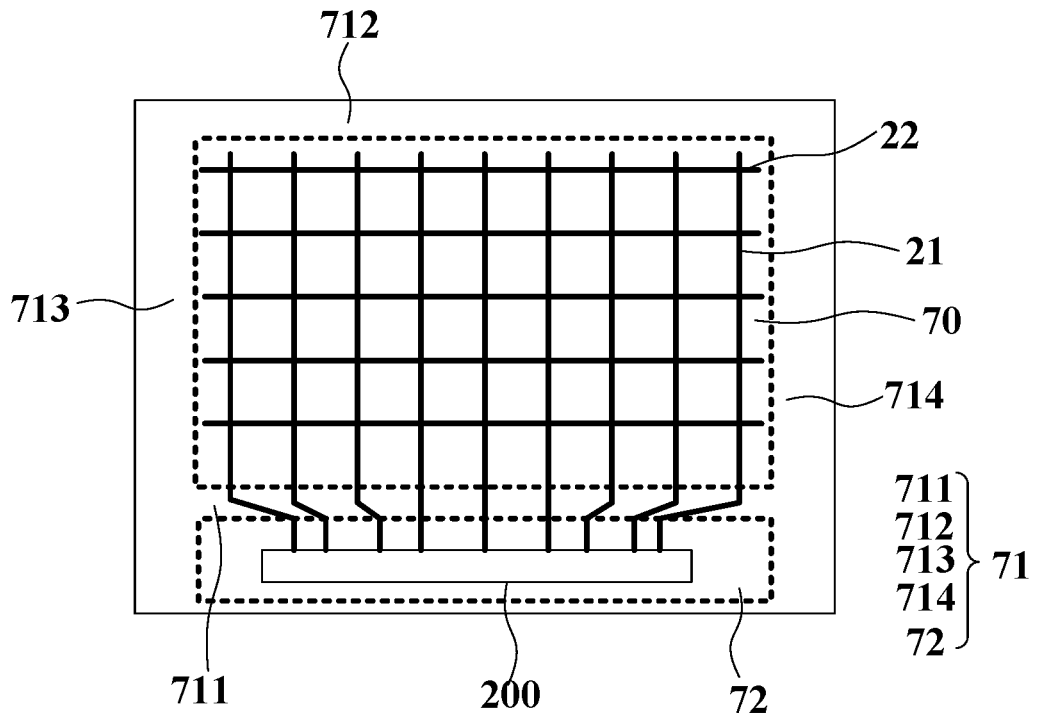
FIG. 19 is a structural diagram of another display panel provided by an embodiment of the present disclosure.

The display panel provided by the embodiment of the present disclosure includes a display area and a non-display area disposed at a periphery of the display area. For example, as shown in FIG. 19, the non-display area 71 at a periphery of the display area 70 includes a chip binding area 72. The chip binding area 72 is configured to bind a driver chip 200, and each data line 21 extends from the display area 70 to the non-display area 71 and is electrically connected to the driver chip 200. Exemplarily, in FIG. 19, the driver chip 200 is directly bound to the array substrate of the display panel i.e., a chip on glass (COG) design. In other embodiments, a chip on film (COF) design may also be adopted, that is, the driver chip 200 is bound to a flip-chip film, and the flip-chip film is bound to the chip binding area 72.

The display panel provided by the embodiment of the present disclosure may, for example, be quadrilateral, and the non-display area 71 includes a first non-display area 711, a second non-display area 712, a third non-display area 713, a fourth non-display area 714 and a chip binding area 72. The first non-display area 711 is opposite to the second non-display area 712 and the third non-display area 713 is opposite to the fourth non-display area 714. The first non-display area 711 and the second non-display area 712 are disposed at different ends of data lines 21 and the third non-display area 713 and the fourth non-display area 714 are disposed at different ends of scan lines 22. The chip binding area 72 is disposed in the first non-display area 711.

Figure 20:
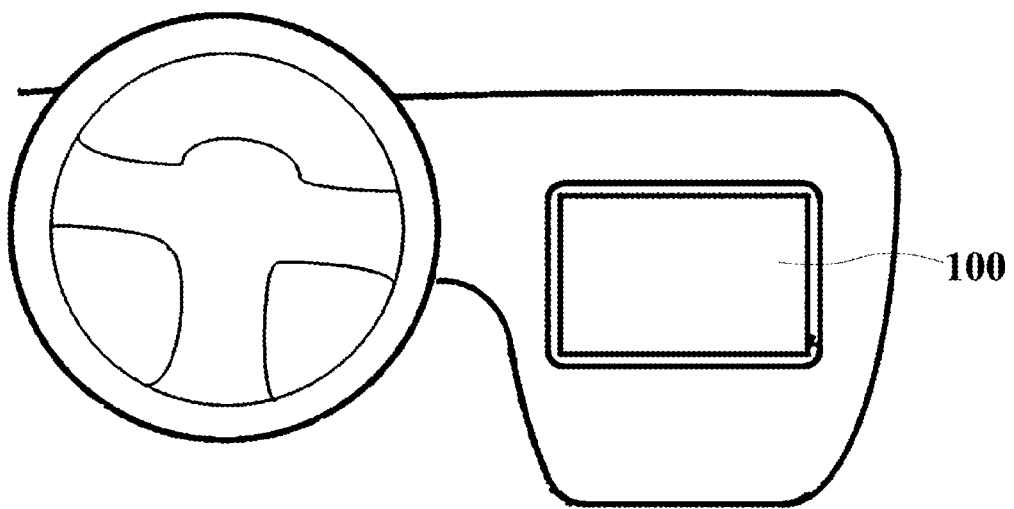
FIG. 20 is a structural diagram of a display device provided by an embodiment of the present disclosure.

An embodiment of the present disclosure further provides a display device. The display device provided by the embodiment of the present disclosure includes the display panel in any one of the preceding embodiments. Therefore, the display device provided by the embodiment of the present disclosure also has the effects described in the preceding embodiments. The details are not repeated here. The display device provided by the embodiment of the present disclosure may also include other circuits and devices for supporting the normal operation of the display device. The preceding display device can be one of a mobile phone, a tablet PC, a television, a vehicular central control screen and the like. FIG. 20 is a structural diagram of a display device provided by an embodiment of the present disclosure. As shown in FIG. 20, the display device is applied to the in-vehicle and includes the display panel 100 in any one of the preceding embodiments.

Since the driver is located on one side of the in-vehicle control screen and needs a large squint viewing angle when viewing the in-vehicle control screen, the pixel design of the embodiment of the present disclosure can improve the contrast of the display panel at the time of viewing in the large squint viewing angle. Therefore, when the driver views on the vehicular central control screen from the large squint viewing angle, such as views navigation pictures displayed on the vehicular central control screen during driving, the driver can see relatively clear pictures.

What is claimed is:

1. A display panel, comprising:
a plurality of data lines and a plurality of scanning lines, wherein the plurality of data lines intersects with the plurality of scanning lines to define a plurality of pixel units arranged in an array, and the plurality of data lines are insulated from the plurality of scanning lines; and
wherein pixel electrodes of pixel units in at least part of the array comprise a plurality of first branch electrodes arranged in parallel;
along a direction of the plurality of scanning lines, each of the plurality of first branch electrodes comprises a plurality of first branch electrode segments connected sequentially, and an included angle between two adjacently connected first branch electrode segments of the plurality of first branch electrode segments is less than 180°;
wherein along the direction of the plurality of scanning lines, the display panel comprises a first area, a second area and a third area which are sequentially arranged, and the first area is an area closest to a viewer;
wherein each of pixel electrodes of pixel units in the second area and the third area comprise a plurality of first branch electrodes arranged in parallel;
along the direction of the plurality of scanning lines, each of the plurality of first branch electrodes comprises a plurality of first branch electrode segments sequentially connected; and
an included angle between two adjacently connected first branch electrode segments of the plurality of first branch electrode segments is less than 180°; and
wherein each of pixel electrodes of pixel units in the first area comprises M second branch electrodes sequentially arranged along a direction of the plurality of data lines;
along the direction of the plurality of data lines, second branch electrodes numbered from a first second branch electrode to a j-th second branch electrode are parallel; second branch electrodes numbered from a (j+1)-th second branch electrode to an M-th second branch electrode of the M second branch electrodes are parallel; and an included angle between the j-th second branch electrode and the (j+1)-th second branch electrode is less than 180°,
wherein M is a positive integer greater than 2, and j is a positive integer greater than 1 and less than (M−1).

2. The display panel of claim 1, wherein each of the plurality of scanning lines is a straight line.

3. The display panel of claim 1, further comprising: a black matrix;
wherein the black matrix comprises a plurality of openings, a vertical projection of the pixel electrodes onto a plane where the black matrix is located overlaps the plurality of openings of the black matrix, and the plurality of pixel units further comprises a pixel circuit; and
along the direction of the plurality of data lines, the black matrix comprises a first portion and a second portion disposed between two adjacent openings of the plurality of openings; and
along the direction of the plurality of data lines, a width of the first portion is greater than a width of the second portion, and a vertical projection of the pixel circuit onto the plane where the black matrix is located is within the first portion.

4. The display panel of claim 3, wherein the pixel circuit is disposed at a corner of an area defined by the plurality of data lines intersecting with the plurality of scanning lines.

5. The display panel of claim 1, wherein each of the pixel electrodes further comprises one terminal electrode,
wherein the one terminal electrode extends along the direction of the plurality of data lines, and the one terminal electrode is disposed between one of the plurality of data lines and the plurality of first branch electrodes comprised in the pixel electrode; and
first terminals of the plurality of first branch electrodes in one pixel unit of the plurality of pixel units are all electrically connected to the one terminal electrode, and second terminals of the plurality of first branch electrodes in the one pixel unit are configured in a floating state; or
the second terminals of the first branch electrodes in one pixel unit of the plurality of pixel units are all electrically connected to the one terminal electrode, and the first terminals of the plurality of first branch electrodes in the one pixel unit are configured in a floating state.

6. The display panel of claim 1, wherein the pixel electrodes further comprise a first terminal electrode and a second terminal electrode;
wherein the first terminal electrode and the second terminal electrode both extend along the direction of the plurality of data lines, the first terminal electrode is disposed between one of the plurality of data lines and first terminals of the plurality of first branch electrodes comprised in the plurality of pixel units, and the second terminal electrode is disposed between one of the plurality of data lines and second terminals of the plurality of first branch electrodes.

7. The display panel of claim 6, wherein the first terminal electrode comprises a plurality of first terminal electrode segments, and the second terminal electrode comprises a plurality of second terminal electrode segments,
wherein among N first branch electrodes sequentially arranged along the direction of the plurality of data lines, every three adjacent first branch electrodes are configured as an i-th first branch electrode, an (i+1)-th first branch electrode and an (i+2)-th first branch electrode, a first terminal of the i-th first branch electrode is electrically connected to a first terminal of the (i+1)-th first branch electrode through one of the plurality of first terminal electrode segments, and a second terminal of the (i+1)-th first branch electrode is electrically connected to a second terminal of the (i+2)-th first branch electrode through one of the plurality of second terminal electrode segments, wherein N is a positive integer greater than 2, i is a positive integer greater than or equal to 1 and less than or equal to (N−2).

8. The display panel of claim 6, wherein
among N first branch electrodes sequentially arranged along the direction of the plurality of data lines, the first terminals of a first branch electrode to an i-th first branch electrode are electrically connected through the first terminal electrode, and the second terminals of the first branch electrode to an (i−1) first branch electrode are configured in a floating state; and
the second terminals of the i-th first branch electrode to an N-th first branch electrode are electrically connected through the second terminal electrode, and the first terminals of an (i+1)-th first branch electrode to the N-th first branch electrode are configured in a floating state,
wherein N is a positive integer greater than 2, and i is a positive integer greater than 1 and less than (N−1).

9. The display panel of any one of claims 5 to 8, further comprising:
a black matrix, wherein the black matrix comprises a plurality of openings, and a vertical projection of the pixel electrodes onto a plane where the black matrix is located overlaps the plurality of openings of the black matrix;
along the direction of the plurality of scanning lines, the black matrix comprises notches disposed between two adjacent openings of the plurality of openings; and
wherein a vertical projection of the terminal electrode on the plane where the black matrix is located is within the black matrix.

10. The display panel of claim 1, wherein the plurality of scanning lines is parallel to the plurality of first branch electrodes.

11. The display panel of claim 1, wherein the direction of the plurality of scanning lines is a row direction of the array of the plurality of pixel units; and
the first branch electrodes of adjacent pixel units in a same column of the plurality of pixel units are symmetrical with respect to the row direction of the array; or the first branch electrodes of the adjacent pixel units in a same row of the plurality of pixel units are centrosymmetric; or the first branch electrodes of the adjacent pixel units in the same column of the plurality of pixel units are symmetrical with respect to the row direction of the array and the first branch electrodes of the adjacent pixel units in the same row of the plurality of pixel units are centrosymmetric.

12. The display panel of claim 1, further comprising:
an array substrate and a color filter substrate disposed opposite to each other; and
a liquid crystal layer disposed between the array substrate and the color filter substrate; and
wherein the pixel electrodes are disposed in the array substrate, the array substrate further comprises a common electrode insulated from the pixel electrodes.

13. The display panel of claim 12, further comprising:
a first polarizer disposed on one side of the array substrate facing away from the color filter substrate, a second polarizer disposed on one side of the color filter substrate facing away from the array substrate, and an optical compensation film disposed between the first polarizer and the array substrate; and
the optical compensation film is configured to reduce a phase delay of the liquid crystal layer with respect to light.

14. The display panel of claim 1, further comprising:
a black matrix, wherein the black matrix comprises a plurality of openings, a vertical projection of the pixel electrodes onto a plane where the black matrix is located overlaps the plurality of openings of the black matrix, and a vertical projection of a connection portion of two adjacent first branch electrode segments of the plurality of first branch electrode segments in a plane where the black matrix is located is disposed in the black matrix.

15. A display device, comprising: a display panel, wherein the display panel comprises:
a plurality of data lines and a plurality of scanning lines, wherein the plurality of data lines intersect with the plurality of scanning lines to define a plurality of pixel units arranged in an array, and the plurality of data lines are insulated from the plurality of scanning lines; and
wherein pixel electrodes of pixel units in at least part of the array comprise a plurality of first branch electrodes arranged in parallel;
along a direction of the plurality of scanning lines, each of the plurality of first branch electrodes comprises a plurality of first branch electrode segments connected sequentially, and an included angle between two adjacently connected first branch electrode segments of the plurality of first branch electrode segments is less than 180°;
wherein along the direction of the plurality of scanning lines, the display panel comprises a first area, a second area and a third area which are sequentially arranged, and the first area is an area closest to a viewer;
wherein each of pixel electrodes of pixel units in the second area and the third area comprise a plurality of first branch electrodes arranged in parallel;
along the direction of the plurality of scanning lines, each of the plurality of first branch electrodes comprises a plurality of first branch electrode segments sequentially connected; and
an included angle between two adjacently connected first branch electrode segments of the plurality of first branch electrode segments is less than 180°; and
wherein each of pixel electrodes of pixel units in the first area comprises M second branch electrodes sequentially arranged along a direction of the plurality of data lines;
along the direction of the plurality of data lines, second branch electrodes numbered from a first second branch electrode to a j-th second branch electrode are parallel; second branch electrodes numbered from a (j+1)-th second branch electrode to an M-th second branch electrode of the M second branch electrodes are parallel; and an included angle between the j-th second branch electrode and the (j+1)-th second branch electrode is less than 180°,
wherein M is a positive integer greater than 2, and j is a positive integer greater than 1 and less than (M−1).

* * * * *